UNITED STATES PATENT OFFICE.

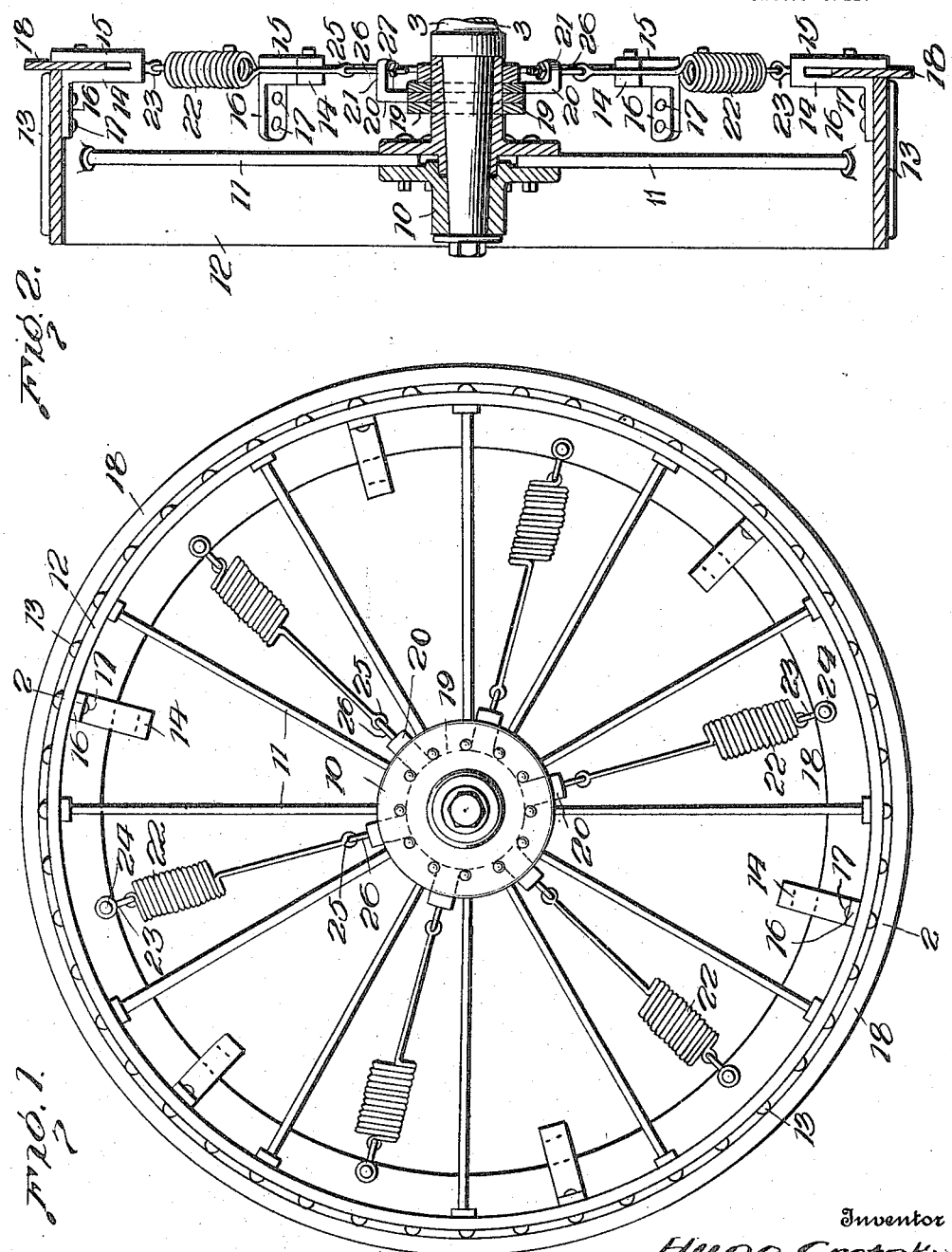

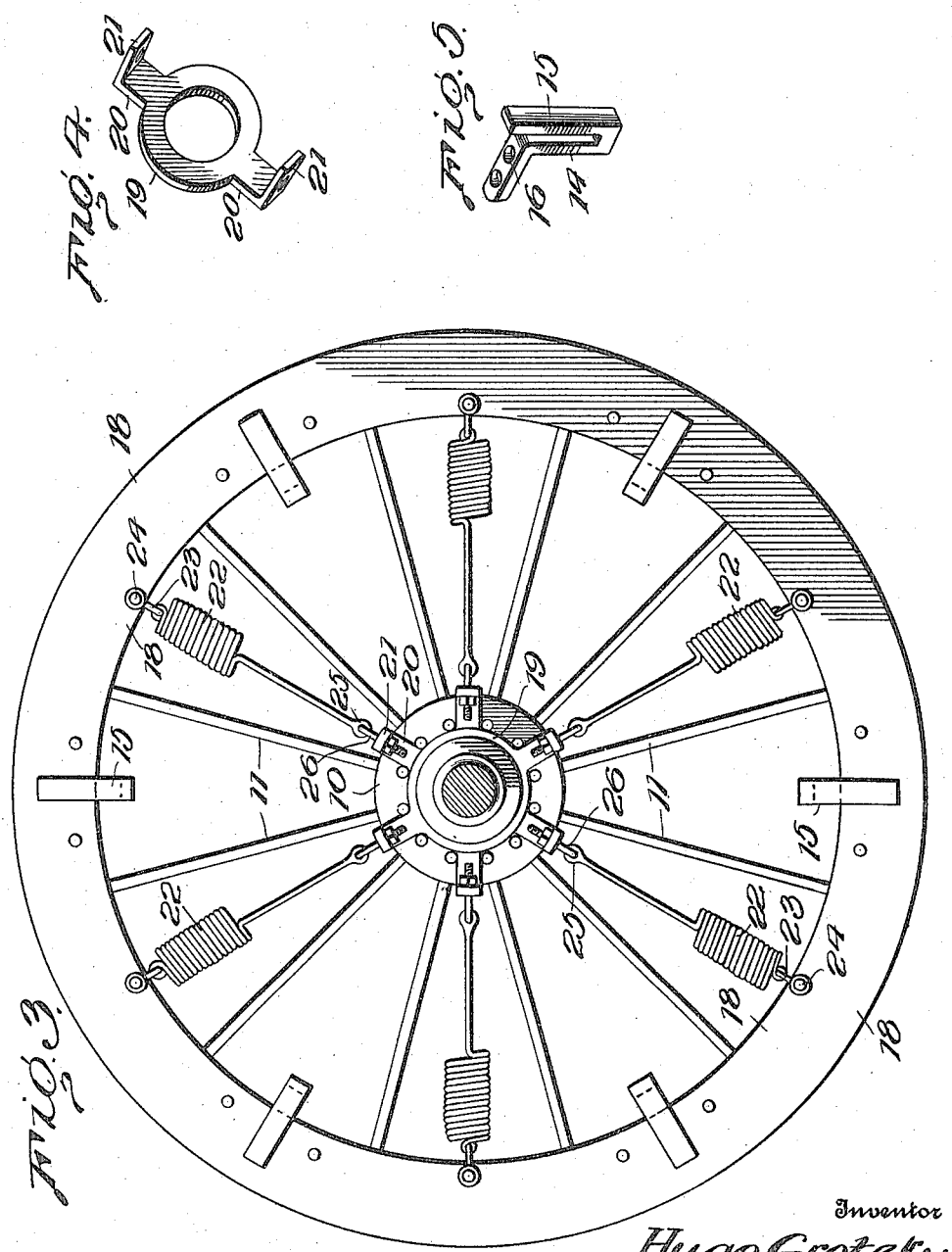

HUGO GROTZKY, OF CHAPMAN, NEBRASKA.

WHEEL ATTACHMENT.

1,163,004.

Specification of Letters Patent.

Patented Dec. 7, 1915.

Application filed August 5, 1915. Serial No. 43,815.

*To all whom it may concern:*

Be it known that I, HUGO GROTZKY, a citizen of the United States, residing at Chapman, in the county of Merrick and State of Nebraska, have invented certain new and useful Improvements in Wheel Attachments, of which the following is a specification.

This invention relates to attachments for wheels to prevent lateral movement or "skidding", and has for one of its objects to simplify and improve the construction and increase the utility of devices of this character.

Another object of the invention is to provide a simply constructed device more particularly applicable to traction engines and similar vehicles which will yield when running over hard roads or pavements but which will enter the bed of the road or the soil when traveling over soft roads, fields or the like.

Another object of the invention is to provide a simply constructed device which may be applied without material structural change to any of the various forms of wheels employed upon traction engines and similar vehicles.

With these and other objects in view, the invention consists in certain novel features of construction as hereinafter shown and described and then specifically pointed out in the claims; and in the drawings illustrative of the preferred embodiment of the invention, Figure 1 is a side elevation of the conventional traction wheel viewed from the outside with the improvement applied. Fig. 2 is a section on the line 2—2 of Fig. 1. Fig. 3 is a view similar to Fig. 1 viewed from the inside with the axle in section on the line 3—3 of Fig. 2. Fig. 4 is a detached perspective view of one of the spring supporting yokes. Fig. 5 is a perspective view of one of the supporting clips of the anti-skidding member.

Corresponding and like parts are referred to in the following description and indicated in all the views of the accompanying drawings by the same reference characters.

The improved device may be applied without structural change to wheels of various forms, and it is not desired therefore to limit the device to any specific form of wheel, but for the purpose of illustration, the improved device is shown applied to a conventional traction wheel of an ordinary traction engine, to which the device is more particularly applicable, and in the drawings thus employed, the hub of the wheel is indicated conventionally at 10, the spokes at 11 and the rim at 12 having the usual anti-sliding ribs 13, these parts being of the usual construction.

Attached to the rim at suitable intervals are combined clip and guide devices, each comprising spaced sides 14—15 and a lateral offset 16. The offset 16 is secured by rivets or other suitable fastening devices 17 to the rim 12 with the space between the sides 14—15 in alinement with the adjacent edge of the rim, as illustrated in Fig. 2. The outer portion 15 of the clip device is longer than the inner portion 14 so that the outer terminal of the portion 15 is substantially in transverse alinement with the outer face of the rim 12, as illustrated in Fig. 2. The clip devices provide combined guides and supports for an annular member, represented as a whole at 18, the member 18 thus bearing against one edge of the rim 12 and projecting normally for a considerable distance beyond the outer face of the same, as illustrated in Figs. 1, 2 and 3. The clip devices are of greater length than the width of the member 18 when arranged concentrically to the rim of the wheels so that a considerable degree of play is permitted to the annular member, the object to be hereafter explained.

Any required number of the clip devices may be employed, but for the purpose of illustration six are shown and spaced at uniform distances apart, preferably midway between each alternate pair of the spokes 11.

Surrounding the hub 10 are a plurality of yoke devices, one of which is illustrated in Fig. 4 and each comprising an annular central portion 19 and oppositely directed projections 20 having lateral offsets 21. The yoke devices will correspond to the clip devices, and when six of the clip devices are employed three of the yoke devices will be used or with six of the projecting portions 20—21. The yoke devices are arranged side by side upon the hub, as illustrated in Fig. 2 with one of the projections 20—21 directed toward an intermediate point between a pair of the combined clip and guide devices. A spring 22 is located between each pair of the clip devices and connected at one end to a loop 23, which is connected in turn at 24 to the annular member 18. At its other end the spring is connected at 25 to an eye bolt 26 which extends through one of the lateral portions 21 of one of the yoke devices and is threaded to receive an adjusting nut 27. One pair of the springs will be connected to each opposite pair of the projections 20 upon one of the yoke devices, and when the adjusting nuts 27 are manipulated, it will be obvious that strain will be applied equally to each opposite pair of the springs, and by arranging the springs around the entire body of the wheel, as illustrated in Figs. 1 and 2, the annular member 18 may be supported yieldably and maintained normally in concentric relation to the rim of the wheel, while at the same time the annular member is yieldable when a sufficient pressure is applied to overcome the resistance of the springs. The springs may be of any required strength to provide for any required degree of resistance.

When the wheels of the vehicle are provided with the attachment just described, it will be obvious that when running upon hard roads or pavements, the downward pressure upon the wheel will cause the annular member to be moved upwardly against the resistance of the springs and produce no effect, but when the vehicle moves over soft roads or over fields or the like, the projecting portion of the member 18 will enter the soil, as the resistance of the springs is greater than the resistance of such soil or road bed, and thus produce an effective antiskidding element and effectually preventing lateral movement or slipping of the wheels.

The improved device may be modified in immaterial points relative to the size and its resisting qualities to adapt it to vehicles of different forms and to wheels of different constructions.

Having thus described the invention, what is claimed as new is:

1. An attachment for wheels comprising an annular member adapted to bear against a wheel rim, a plurality of clips adapted to be attached to said wheel rim and in which said annular member is movably supported, a plurality of yoke devices adapted to be engaged with the hub of said wheel, and a plurality of springs connected to said yoke devices and to said annular member.

2. An attachment for wheels comprising an annular member adapted to bear against a wheel rim, a plurality of clips adapted to be attached to said wheel rim and in which said annular member is movably supported, and a plurality of springs connected to said annular member and adapted to be connected to the hub of said wheel.

3. The combination with a wheel including a rim and a hub, of an annular member bearing against said rim, a plurality of clip devices attached to said rim and in which said annular member is movably supported, a plurality of yoke devices carried by said hub, and a plurality of springs connected respectively to said yokes and to said annular member.

4. An attachment for wheels comprising an annular member, guiding devices adapted to be attached to a wheel rim and in which said annular member is movably supported, and springs connected to the hub of said wheel and to said annular member.

5. An attachment for wheels comprising an annular member, guiding devices adapted to be attached to a wheel rim and in which said annular member is movably supported, anchoring devices adapted to be engaged with the hub of said wheel, and springs connected to said anchoring devices and to said annular member.

In testimony whereof I affix my signature in presence of two witnesses.

HUGO GROTZKY. [L. S.]

Witnesses:
CHAS. G. RYAN,
M. GUY BRITT.

Copies of this patent may be obtained for five cents each, by addressing the "Commissioner of Patents, Washington, D. C."